A. HAVERLOCK.
CHECK PROTECTOR.
APPLICATION FILED APR. 16, 1918.
1,285,154.
Patented Nov. 19, 1918.
4 SHEETS—SHEET 3.
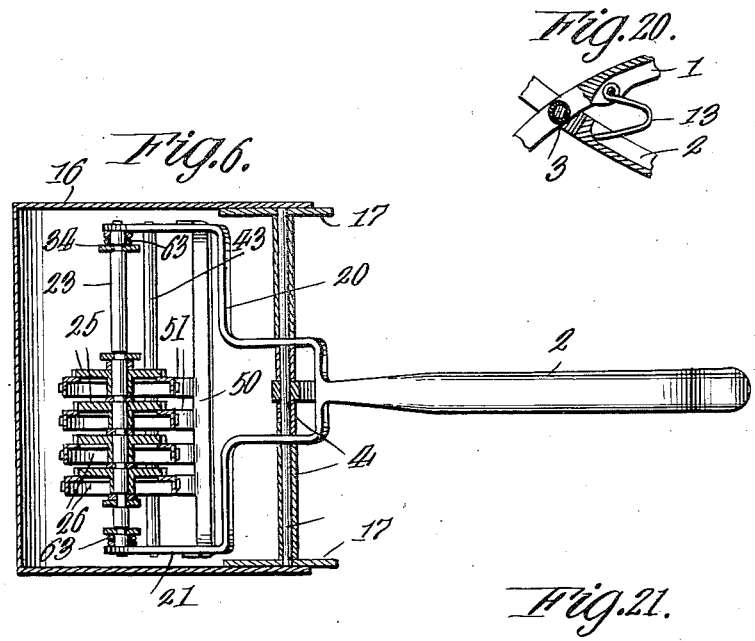
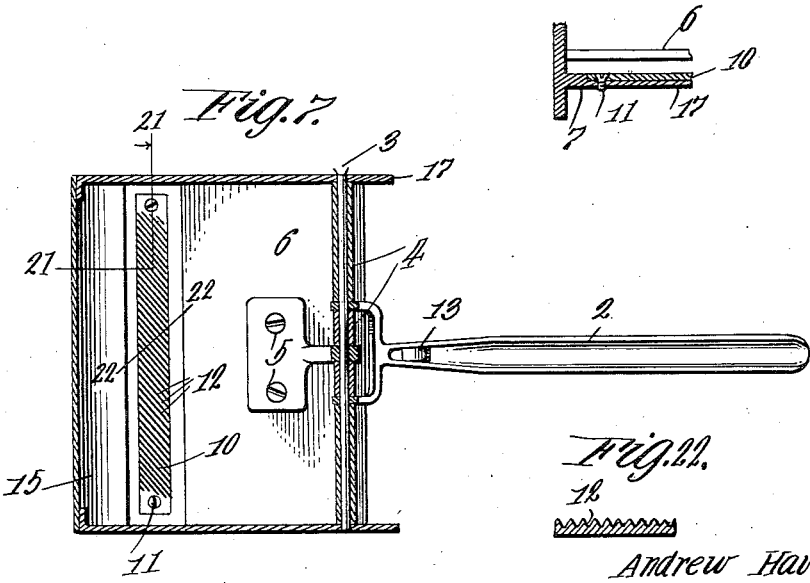
INVENTOR
Andrew Haverlock
WITNESSES
Guy M. Spring
N. L. Collamer
BY Richard B. Owen.
ATTORNEY

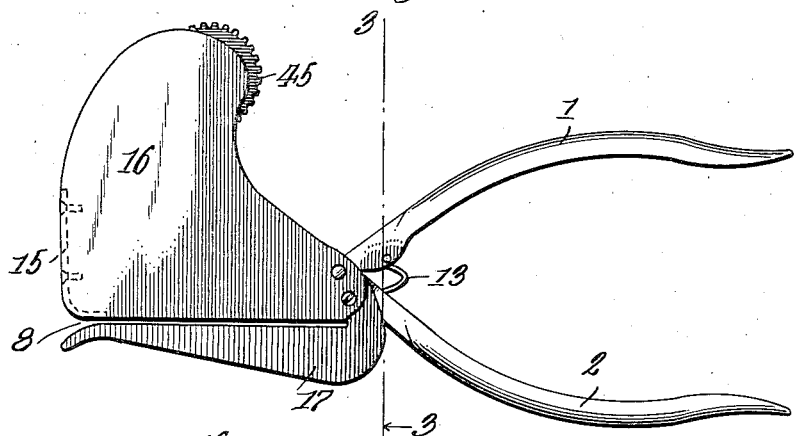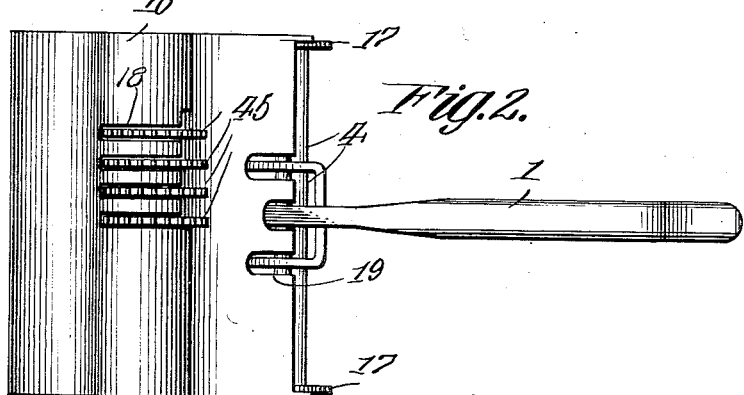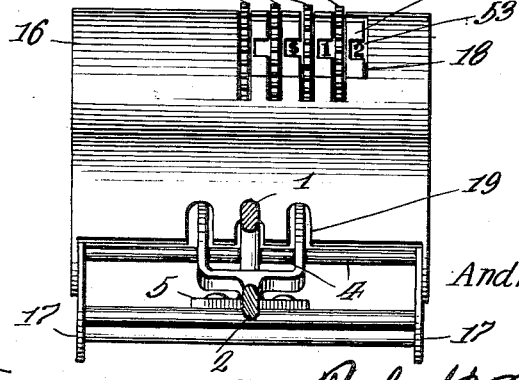

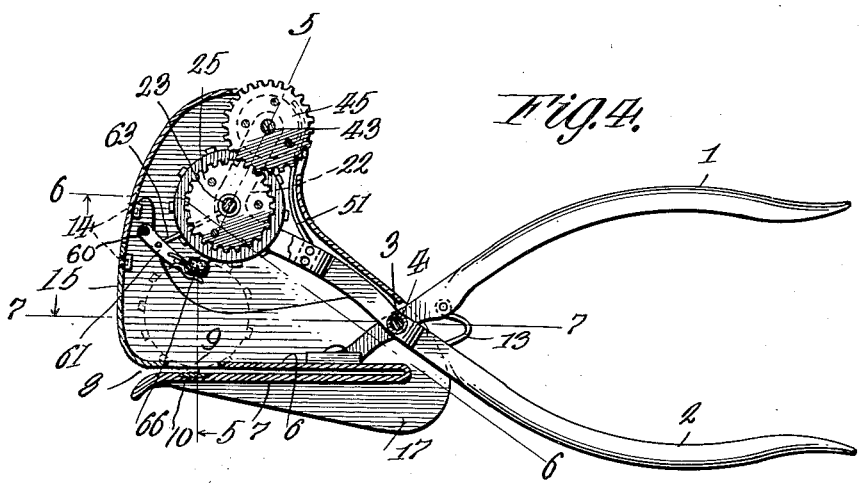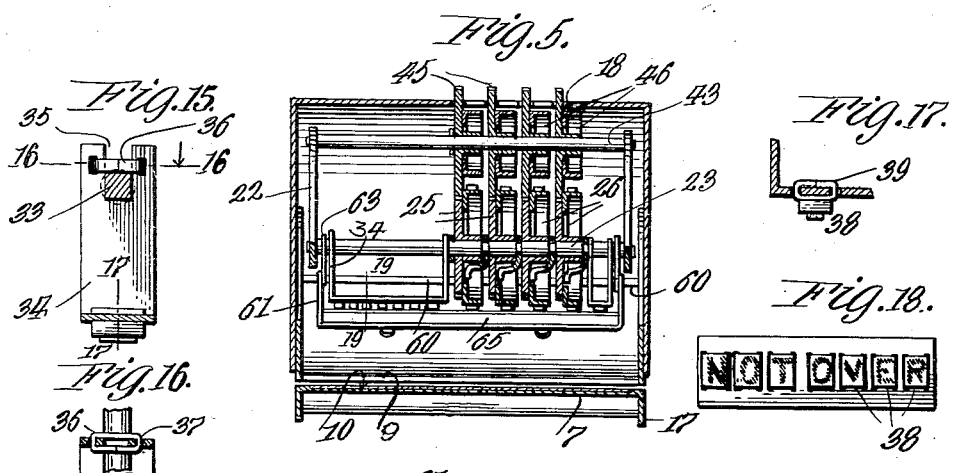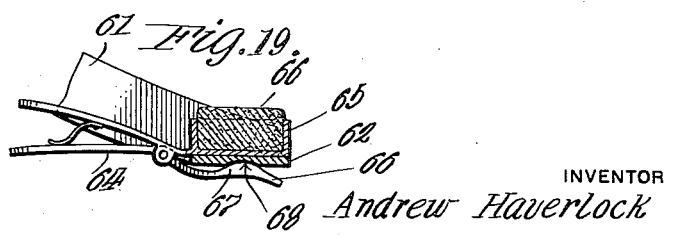

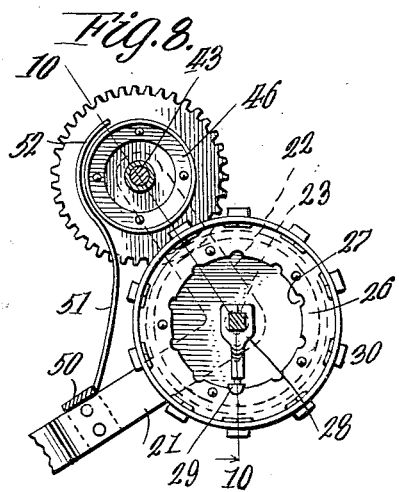
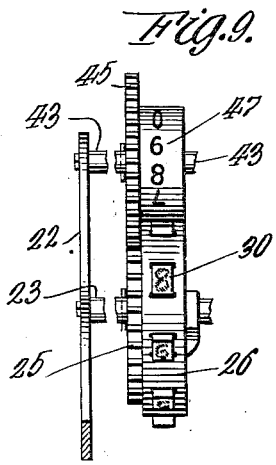
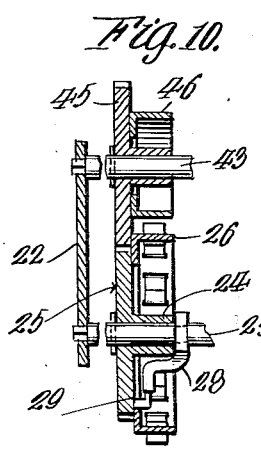
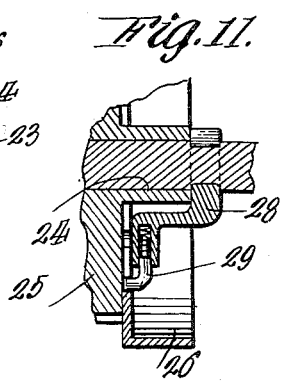
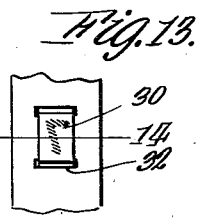

UNITED STATES PATENT OFFICE.

ANDREW HAVERLOCK, OF SAN FRANCISCO, CALIFORNIA.

CHECK-PROTECTOR.

1,285,154.  Specification of Letters Patent.  Patented Nov. 19, 1918.

Application filed April 16, 1918. Serial No. 228,931.

*To all whom it may concern:*

Be it known that I, ANDREW HAVERLOCK, a citizen of the United States, residing at San Francisco, in the county of San Francisco and State of California, have invented certain new and useful Improvements in Check-Protectors, of which the following is a specification.

This invention relates to hand stamps, and more especially to check punches; and the object of the same is to produce an improved check protector wherein the amount of the check is impressed in and simultaneously printed upon the paper in figures following the legend "not over" and preceding a star or other sign, so that the amount can not be raised fraudulently.

The invention consists in various features of improvement as will be brought out in the following specification and claims, and reference is made to the accompanying drawings, wherein:—

Figure 1 is a side elevation and

Fig. 2 a plan view of this device complete,

Fig. 3 is a vertical section on the line 3—3 of Fig. 1.

Fig. 4 is a central longitudinal vertical section, and

Figs. 5, 6, and 7 are sections drawn on the lines 5—5, 6—6, and 7—7 respectively of Fig. 4.

Fig. 8 is an enlarged sectional detail of one pair of wheels in side elevation, and Fig. 9 is a similar detail of the same wheels in edge elevation, while Fig. 10 is a section on the line 10—10 of Fig. 8, and Fig. 11 is an enlarged sectional detail on about the same line, Fig. 12 is a fragmentary section through the rim of a type wheel showing the manner in which the type are attached thereto, Fig. 13 is a fragmentary plan view of a portion of said rim, and Fig. 14 is a section on the line 14—14 of Fig. 13, Fig. 15 is a sectional detail showing how one of the arms of the die-yoke is attached to its supporting shaft, Fig. 16 is a section taken on the line 16—16 of Fig. 15, and Fig. 17 is a section on the line 17—17 of Fig. 15, while Fig. 18 is a bottom plan view showing the fixed die, Fig. 19 is an enlarged sectional detail showing the spring clip for carrying the ink pad, and its manner of attachment to the yoke which supports it, Fig. 20 is an enlarged sectional detail showing the spring between the main operating arms or levers, Figs. 21 and 22 are enlarged sections on the lines 21—21 and 22—22 respectively of Fig. 7.

Upper and lower main levers or arms 1 and 2 cross each other and are pivotally connected by the main shaft 3, whereon they are held in proper position by means of spacers 4 as best seen in Fig. 7; and the inner end of the lower arm carries the movable elements of this tool to be described below, while the inner end of the upper arm carries the relatively fixed elements, as follows: The inner end is secured as at 5 upon a plate constituting an upper jaw 6, the plate extending thence to the rear, curving downward and forward, and extending thence forward in a lower jaw 7 underlying and spaced from the upper jaw so as to leave an opening whose front end constitutes the mouth 8 into which the check to be perforated or punched is inserted. Near its front edge the upper jaw has an opening 9 through which the type are projected downward in a manner yet to appear, and at a corresponding point beneath it the lower jaw carries the platen 10, the same in this case being a strip secured upon the lower jaw by screws 11 or otherwise and having its face corrugated on oblique lines as indicated at 12. I will say at this point that the face of the type employed on the wheels and in the dies must be correspondingly corrugated, as perhaps best seen in Fig. 18, so that when they are brought down onto the platen with the paper of the check between them, said paper will be stamped or impressed with a series of fine, oblique corrugations constituting the outline of letters or figures in a manner well understood. I would not be limited in this respect, because it is obvious that corrugations of other shape and disposition might be employed, it is possible that the check could be perforated by means of points on the dies entering cavities in the platen, and it is even possible to perforate the check in a manner without necessarily inking the dies which do the perforating as described below and as I prefer to do. The lower jaw 7 has flanges 17 which support it rigidly at its ends, whereas the ends of the upper jaw 6 are carried upward and constitute the ends 16 of a hood, the same shaped as perhaps best seen in Figs. 1 and 2 and mounted on the extremities of the main shaft 3 in a manner which will be clear. For gaining access to the interior of this hood, a portion 15 of its front wall (see dotted lines in Fig. 1) is rendered removable in any suitable way, as by being attached to the remainder of the hood by screws 14, certain of which are shown removed in Fig. 4. The top of the hood is arched as best seen in Figs. 1 and 2, and has an opening 18 to permit the hand wheels to project therethrough, and other openings 19 for the crossing and pivoted portions of the two main levers. The latter are normally spread to the position best seen in Fig. 4 by a spring 13 between them. All that part thus far described constitutes what might be said to be the relatively fixed portion of this instrument or tool, and the same is carried by the inner end 5 of the upper handle 1.

The lower handle 2 passes into the rear end of the hood as seen in Fig. 4, and is pivoted on the main shaft 3, is then forked as shown at 20 in Fig. 6, and the fork arms 21 are given a right-angular bend at their inner ends as seen in Fig. 4, and carried upward in what I will call elbows 22 standing just inside the ends 16 of the hood and normally just under the bent top of the latter as shown. Connecting the angles in said fork-arms is a shaft 23 on which are mounted rotatably the hubs 24 of a series of gear wheels 25, each gear carrying a type wheel 26 on that face which surrounds its extended hub as seen in Fig. 10 and each type wheel itself consisting of an annulus of L-shaped cross section whose circumferential flange carries the type and whose radial flange has notches as indicated at 27 in Fig. 12, the notches corresponding in number and in disposition with the type themselves.

Fast on the shaft between each two hubs 24 is a detent 28 as best shown in Fig. 11, the same having a spring tip 29 which engages the notches 27 as they respectively come under it when the type wheel is turned. The type 30 are of the configuration best shown in Figs. 12, 13 and 14, and by preference held on the circumferential flange of the annulus by fasteners 31 engaging or passing through slots 32 in said flange as there illustrated; although other suitable fasteners might be employed to render the type interchangeable and alterable when desired. In Fig. 5 I have shown four such type wheels disposed side by side and rotatably mounted on the shaft 23. Each end of this shaft is non-round, being shown in Fig. 15 as square at 33, and on the square portion are mounted the arms 34 of a die-yoke. These arms may be notched at 35 at their upper ends and passed astride said shaft, and the notched portions connected by a fastener 36 passing through openings in them as shown in Figs. 15 and 16. The body of the die-yoke carries type 38 which may be secured thereto by fasteners 39 of the same or of any approved construction, and these type will spell the legend "not over" at the left side of the series of type wheels, whereas the smaller yoke shown in Fig. 5 at the right side of said figures will carry a single type which will imprint or impress a star or similar symbol at the right of the series of figures being printed on the check.

The upper ends of the elbows 22 are connected by another shaft 43 which is round throughout its length, and on this shaft are mounted the hubs 44 of other gears 45 meshing with those numbered 25 and corresponding in number therewith. Each gear 45 carries an annulus 46 of L-shaped cross section, and the circumferential flange thereof bearing number 47 in Fig. 9 is marked or inscribed on its face with figures which correspond with those on the type of the meshing type wheel. The gears 45 may be smaller than those numbered 25, and they are employed for rotating the type wheels by hand. Such gears 45 project through the opening 18 in the top of the hood, and said opening is of such shape that the numbered flanges 47 adjacent the gears are exposed therethrough, and therefore the operator by looking at these numbers as seen in Fig. 3 may know instantly what type at that time stands at the bottom of the several type wheels.

A refinement I propose to employ will be described at this time, being best shown in Fig. 8. A cross bar 50 is mounted on the fork 20, and from it rise a number of flat spring fingers 51 corresponding with the number wheels 47. The upper ends of these fingers are curved as shown at 52 and overlie said wheel, and said ends may be notched as shown at 53 in Fig. 3 so that only one figure on each number wheel 47 may appear at a time. I may use this detail or not, and in a cheaper grade of machine it might be possible to have these fingers bear on the number wheels frictionally, in which case the detents 28 with spring tips 29 might be omitted, because the position of the number wheels indicates the position of the type wheels, and when the former have their numbers alined as seen in Fig. 3, the relatively corresponding type must be alined at the bottom of the type wheels.

In either case the fixed dies depend rigidly from the non-round portion of the shaft 23 and stand ever in alinement with each other and with the type at the bottom of the type wheels, so that when moved downward by manipulation of the main handles, these dies and all type are projected through an opening 9 in the upper jaw, and the words and figures are imprinted on the check which stands between the jaws in a manner well understood.

The ends of the hood, just inside the front plate of the latter and above the removable plate 15, are connected by a cross rod 60 on which are hung the arms 61 of a yoke whose cross bar 62 is perhaps best seen in Fig. 19, and these arms are connected by links 63 with the shaft 23 so that as the latter rises the yoke is swung upward. To its cross bar 62 is removably applied a pair of spring clips 64 whose upper jaws are connected by a channel 65 containing an inking pad 66, while the lower jaw 67 of each clip has a hump 67 as seen at 19 adapted to engage a depression 68 in the lower side of the cross bar 62. By this simple means the inking attachment may be applied to the cross bar 62 of the yoke, or removed therefrom when the front plate 15 is taken off and access is permitted to the interior for this purpose, and the result is that the face of all type and both dies may be inked if the pad is employed, or the ink may be omitted at pleasure or replenished when it becomes faint. Obviously the rotation of the type wheels to bring the proper type into position causes the type to slide transversely across the ink pad, but the principal inking is done when the main levers are opened to the position of parts shown in Fig. 4 and the links 63 cause the yoke to swing upward so that the ink pad 66 is driven against the type in a manner which will be clear. On the other hand, when the handles are brought together and the movable parts within the hood begin to descend, the first action of the links 63 is to swing the yoke and its ink pad 66 out of the way to permit the type and dies to make their stroke. Other details need not be described. The exact proportions and materials of parts are not essential. The machine as a whole is simple, efficient, easily operated, and readily cleaned and repaired when necessary.

What is claimed as new is:—

1. In a check protector of the plier type, the combination with the handles pivoted to each other, one handle carrying upper and lower jaws, the former having a transverse opening, and a platen carried by the lower jaw beneath said opening; of a fork at the inner end of the other handle, the fork arms having elbows, a shaft connecting the fork arms, a series of type wheels rotatably mounted on said shaft, a gear wheel connected with each, another shaft mounted between the elbows, and a series of gear wheels mounted on this shaft and meshing respectively with the first-named gear wheels.

2. In a check protector of the plier type, the combination with the handles crossing and pivoted to each other where they cross, a hood carried by one handle and including upper and lower jaws, the former having a transverse opening, and a platen carried by the lower jaw beneath said opening; of a fork at the inner end of the other handle, a shaft therein, a series of type wheels rotatably mounted on said shaft, the hood having an opening above said wheels, and fixed dies non-rotatably carried by the same shaft at the ends of said series, the dies and the type of the wheels adapted to be projected through said opening, as described.

3. In a check protector of the plier type, the combination with the handles crossing and pivoted to each other where they cross, a hood carried by one handle and including upper and lower jaws, the former having a transverse opening, and a platen carried by the lower jaw beneath said opening; of a fork at the inner end of the other handle, the fork arms being turned upward into elbows, a shaft connecting the fork arms, a series of type wheels rotatably mounted on said shaft, a gear wheel connected with each, another shaft mounted between the upper ends of the elbows, a series of gear wheels mounted on this shaft and meshing respectively with the first-named gear wheels, the top of the casing having an opening through which these upper gear wheels project, and numbered indicators carried by the last-named wheels.

4. In a check protector of the plier type, the combination with the handles crossing and pivoted to each other where they cross, a hood carried by one handle and including upper and lower jaws, the former having a transverse opening, and a platen carried by the lower jaw beneath said opening; of a fork at the inner end of the other handle, the fork arms being turned upward into elbows, a shaft connecting the fork arms, a series of type wheels rotatably mounted on said shaft, a gear wheel connected with each, another shaft mounted between the upper ends of the elbows, a series of gear wheels mounted on this shaft and meshing respectively with the first-named gear wheels, the top of the casing having an opening through which these upper gear wheels project, an annulus carried by each of the last-named wheels and having numbers on its periphery visible through said opening and corresponding with the type on the respective type wheels, and yielding means for holding the latter alined with the opening in the upper jaw.

5. In an instrument of the type described the combination with a hood having a rounded top with an opening therein, and a platen carried by the lower portion of said hood; of a series of type wheels mounted on a shaft, means for moving said shaft toward and away from the platen, a second shaft disposed in parallelism with the first, a series of number wheels mounted thereon, gearing connecting each number wheel with its respective type wheel, the numbers on the former being visible through the opening in the hood, and fingers overlying the number wheels and having notches exposing but one number at a time.

6. In an instrument of the type described, the combination with a hood having a transverse opening in its upper portion and a transverse platen in its lower portion; of a fork movably mounted within said hood and having parallel shafts, a series of type wheels mounted on the lower shaft in position to aline with said platen, a series of number wheels mounted on the upper shaft in position to have their numbers visible through said opening in the hood, gearing connecting each number wheel with its respective type wheel, and a series of spring fingers mounted on the fork and each overlying the periphery of a number wheel and having a notch exposing but a single number at a time, for the purpose set forth.

7. In a stamp of the type described, the combination with a swinging fork, a platen, and movable levers by which these elements are respectively carried; of a shaft connecting the fork-arms and non-round at certain points, a series of type wheels rotatably mounted on the cylindrical portions of said shaft and each having notches opposite its type, a series of detents non-rotatably mounted on other portions of said shaft and each having a spring tip adapted to engage said notches successively, and fixed dies carried by the non-round portions of said shaft and in alinement with the platen, for the purpose set forth.

8. The combination with a pair of crossed and pivoted handles, a platen carried by one of them, a fork carried by the other handle, a shaft connecting the fork-arms and made square for part of its length and round at other places, a series of type wheels rotatably mounted on the cylindrical portions of the shaft, and means for permitting them to be set; of a fixed die standing in alinement with said platen, a yoke supporting the die and having its arms notched and mounted on the square portion of said shaft, and means for holding it rigidly in such position.

9. The combination with a pair of crossed and pivoted handles, a platen carried by one of them, a fork carried by the other handle, a shaft connecting the fork-arms and made square for part of its length and round at other places, a series of type wheels rotatably mounted on the cylindrical portions of the shaft, and means for permitting them to be set; of a fixed die standing in alinement with said platen, a yoke supporting the die and having its arms notched and mounted on the square portion of the shaft, a fastener connecting the arms above their notches, and means for removably mounting the letters of the die in the cross bar of the yoke, substantially as described.

10. In an instrument of the type described, the combination with a pair of crossed arms whereof one carries a platen, a yoke on the other arm, a shaft between the yoke arms, a series of type wheels adjustably mounted on said shaft, and a hood inclosing said yoke and wheels; of a cross rod fixed within said hood, a yoke whose arms are mounted on said rod and whose cross bar underlies said type wheels, an inking pad removably carried by said cross bar, and links connecting said yokes, for the purpose set forth.

In testimony whereof I affix my signature in presence of two witnesses.

ANDREW HAVERLOCK.

Witnesses:
  COY MYRON E. DEVEAN,
  CHAS. A. SCOVILLE.